US011268665B2

(12) United States Patent
Hsieh

(10) Patent No.: US 11,268,665 B2
(45) Date of Patent: Mar. 8, 2022

(54) LIGHTING ASSEMBLY

(71) Applicant: HABITEX CORPORATION, Taipei (TW)

(72) Inventor: Pei-Lin Hsieh, Taipei (TW)

(73) Assignee: HABITEX CORPORATION, Taipei (TW)

( * ) Notice: Subject to any disclaimer, the term of this patent is extended or adjusted under 35 U.S.C. 154(b) by 0 days.

(21) Appl. No.: 17/147,258

(22) Filed: Jan. 12, 2021

(65) Prior Publication Data

US 2021/0131624 A1    May 6, 2021

Related U.S. Application Data

(63) Continuation of application No. 15/986,560, filed on May 22, 2018.

(51) Int. Cl.
| | |
|---|---|
| *F21S 6/00* | (2006.01) |
| *F21V 21/22* | (2006.01) |
| *F21V 21/108* | (2006.01) |
| *F21V 21/32* | (2006.01) |
| *F16B 7/18* | (2006.01) |

(52) U.S. Cl.
CPC .......... *F21S 6/006* (2013.01); *F21V 21/108* (2013.01); *F21V 21/22* (2013.01); *F21V 21/32* (2013.01); *F16B 7/182* (2013.01)

(58) Field of Classification Search
CPC .. F21S 6/004; F21S 6/005; F21S 6/006; F21S 6/007; F21S 6/008; F21V 21/12; F21V 21/06; F21V 21/108; F21V 21/116; F16B 7/182; F16B 7/185; F16B 7/187; F16B 7/18; F16B 7/0433; F16B 7/0406; F16M 2200/021; F16M 2200/024; F21W 2131/30; H02G 3/06

See application file for complete search history.

(56) References Cited

U.S. PATENT DOCUMENTS

| | | | | |
|---|---|---|---|---|
| 826,437 | A * | 7/1906 | Miller | H02G 3/0616 |
| | | | | 285/149.1 |
| 2,922,031 | A * | 1/1960 | Stiffel | F21V 21/108 |
| | | | | 362/431 |
| 3,104,065 | A * | 9/1963 | Bieber | F21V 21/26 |
| | | | | 362/249.01 |

(Continued)

FOREIGN PATENT DOCUMENTS

| | | | | |
|---|---|---|---|---|
| EP | 1522743 A1 * | 4/2005 | | B08B 9/045 |
| GB | 191102474 A * | 7/1911 | | F16B 7/182 |
| GB | 833802 A * | 4/1960 | | F16B 7/182 |

*Primary Examiner* — Jong-Suk (James) Lee
*Assistant Examiner* — James M Endo
(74) *Attorney, Agent, or Firm* — Ladas & Parry, LLP

(57) ABSTRACT

A lighting assembly includes a light stand, a lighting unit, and a modular rod assembly connecting the lighting unit to the light stand. The modular rod assembly includes a connection rod, a first extension rod connected to the connection rod, and a tubular fastener. The connection rod has a first coupling end. The first extension rod has a second coupling end. The tubular fastener is movably disposed around the first extension rod and is operable to move toward and sleeve around the first and second coupling ends such that the tubular fastener is engaged with the first coupling end and that the second coupling end is clamped between the first coupling end and the tubular fastener.

2 Claims, 16 Drawing Sheets

(56) References Cited

U.S. PATENT DOCUMENTS

| | | | | |
|---|---|---|---|---|
| 3,516,697 A * | 6/1970 | Hahn | F16B 7/182 | 403/118 |
| 3,784,730 A * | 1/1974 | Bannies | H02G 3/06 | 174/75 C |
| 4,019,762 A * | 4/1977 | Eidelberg | F16L 19/086 | 285/340 |
| 4,756,542 A * | 7/1988 | Yang | B62K 15/00 | 280/278 |
| 4,775,922 A * | 10/1988 | Engel | F21S 6/006 | 362/217.07 |
| 4,784,554 A * | 11/1988 | Break | B25B 5/104 | 403/341 |
| D347,488 S * | 5/1994 | Kramer | D26/102 | |
| 5,735,657 A * | 4/1998 | Slepekis | F16B 7/182 | 411/178 |
| 6,114,631 A * | 9/2000 | Gretz | F16L 27/0837 | 174/50.52 |
| 6,280,065 B1 * | 8/2001 | Denningham | F21S 8/037 | 362/414 |
| 7,350,831 B2 * | 4/2008 | Shimizu | F16L 19/0231 | 285/334.5 |
| 7,455,328 B2 * | 11/2008 | Chelchowski | F16L 19/086 | 285/247 |
| 7,547,126 B2 * | 6/2009 | Hiratsuka | F21S 2/005 | 362/241 |
| 7,704,158 B2 * | 4/2010 | Burrows | A63B 60/22 | 473/288 |
| 7,726,701 B2 * | 6/2010 | Koji | F16L 19/0286 | 285/354 |
| 7,866,846 B2 * | 1/2011 | Zheng | F21V 19/0055 | 362/249.02 |
| D668,812 S * | 10/2012 | Sprengers | D26/107 | |
| D822,878 S * | 7/2018 | Yeh | D26/107 | |
| 2004/0047157 A1 * | 3/2004 | Denningham | F21S 6/007 | 362/410 |
| 2007/0159836 A1 * | 7/2007 | Huang | F21V 21/0824 | 362/431 |
| 2007/0254537 A1 * | 11/2007 | Richter | F16B 7/18 | 439/879 |
| 2013/0322097 A1 * | 12/2013 | Schaak | F21S 6/007 | 362/414 |
| 2014/0015245 A1 * | 1/2014 | Chiu | H02G 3/06 | 285/133.11 |
| 2016/0376851 A1 * | 12/2016 | Morrow | E21B 17/0426 | 403/342 |
| 2017/0081853 A1 * | 3/2017 | Kim | E04C 5/0604 | |
| 2018/0207501 A1 * | 7/2018 | Brangers | F21V 33/008 | |

\* cited by examiner

LIGHTING ASSEMBLY

CROSS-REFERENCE TO RELATED APPLICATION

This is a continuation application of U.S. patent application Ser. No. 15/986,560, filed on May 22, 2018.

FIELD

The disclosure relates to a modular rod assembly, and more particularly to a lighting assembly that includes a modular rod assembly.

BACKGROUND

A conventional fishing pole style floor lamp assembly generally includes two rods, one of which has an external thread, and the other one of which has an internal thread. To assemble together the two rods, one of the two rods has to be rotated relative to the other rod to interengage the external and internal threads of the rods. Therefore, the method of assembly is to rotate entirely one of the rods relative to the other rod and is inconvenient. Further, when the rods are assembled, there may be a problem in that the external and internal threads are insufficiently or overly tightened by the user. In case of insufficient tightening, the entire lamp assembly will have poor fixing strength. In case of over-tightening, wires inside the rods will be twisted or entangled, thereby adversely affecting the circuit connection of the lamp assembly.

SUMMARY

Therefore, one object of the disclosure is to provide a modular rod assembly that can alleviate at least one of the drawbacks of the prior art.

According to one aspect of the disclosure, a modular rod assembly includes a connection rod, a first extension rod and at least one tubular fastener.

The connection rod has a first coupling end.

The first extension rod has a second coupling end removably connected to the first coupling end of the connection rod.

The at least one tubular fastener is operable to sleeve around the first and second coupling ends such that the at least one tubular fastener is engaged with the first coupling end and that the second coupling end is clamped between the first coupling end and the at least one tubular fastener.

According to another aspect of the disclosure, a modular rod assembly includes a connection rod, a first extension rod and a tubular fastener.

The connection rod has a first coupling end.

The first extension rod has a second coupling end removably inserted into the first coupling end.

The tubular fastener is operable to sleeve around the first and second coupling ends such that the tubular fastener is engaged with the first coupling end and that the second coupling end is clamped between the first coupling end and the tubular fastener.

Another object of the disclosure is to provide a lighting assembly that can be conveniently assembled.

According to the disclosure, the lighting assembly includes a light stand and a light module.

The light module includes a lighting unit and a modular rod assembly connecting the lighting unit to the light stand. The modular rod assembly includes a connection rod, a first extension rod connected to the connection rod, and a tubular fastener. The connection rod has a first coupling end. The first extension rod has a second coupling end. The tubular fastener is movably disposed around the first extension rod and is operable to move toward and sleeve around the first and second coupling ends such that the tubular fastener is engaged with the first coupling end and that the second coupling end is clamped between the first coupling end and the tubular fastener.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
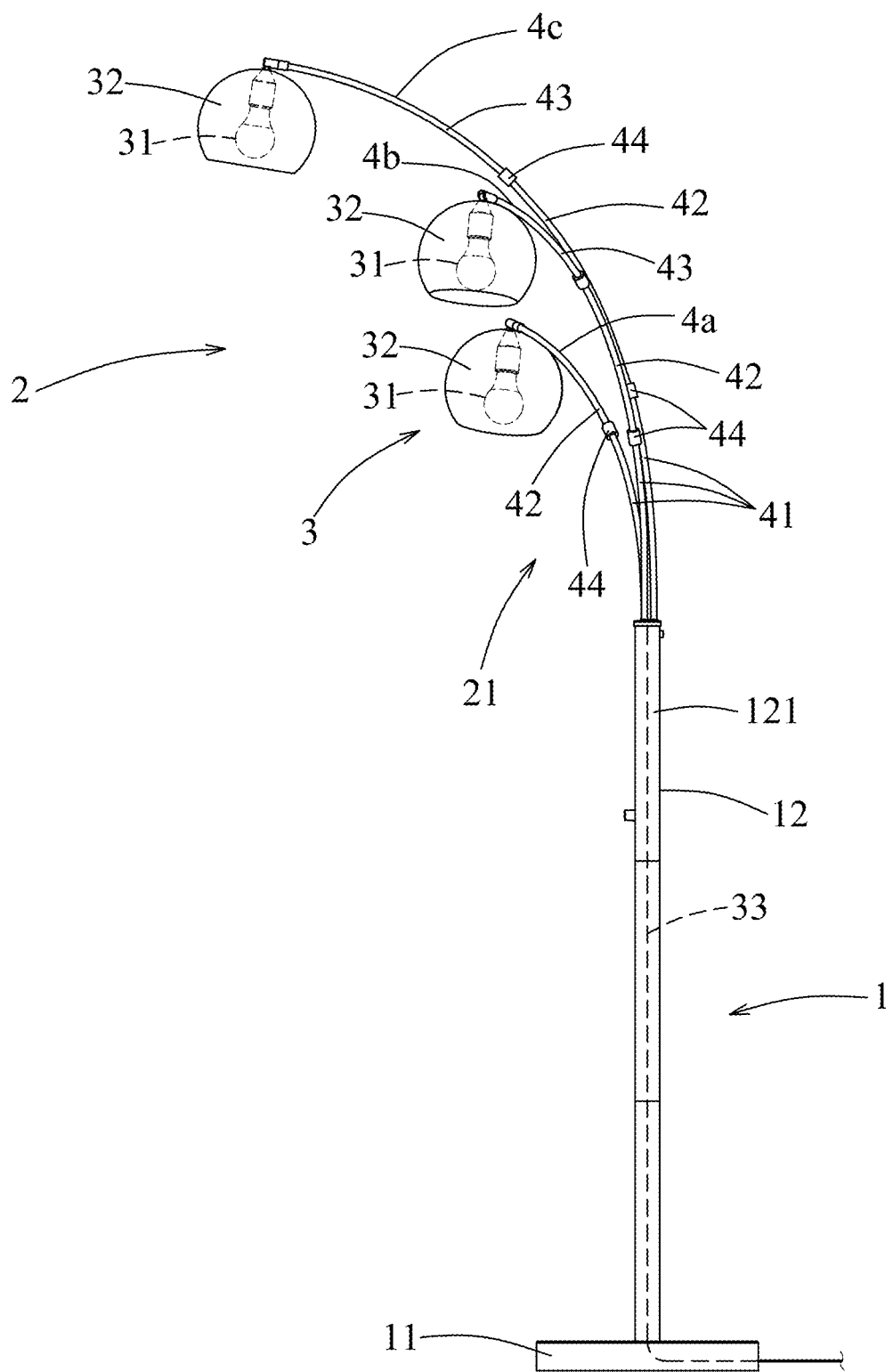
FIG. 1 illustrates a lighting assembly according to a first embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, a lighting assembly according to a first embodiment of the disclosure includes a light stand 1 and a light emitting device 2.

The light stand has a base body 11, and a hollow support post 12 connected to the base body 11. The light emitting device 2 includes three light modules 21 that are arranged in parallel with each other. Each light module 21 includes a light unit 3, and a modular rod assembly 4a, 4b, or 4c connecting the lighting unit 3 to the light stand 1. The light unit 3 includes a light emitter 31, a light shade 32 covering the light emitter 31, and a wire 33 extending through the modular rod assembly 4a, 4b or 4c and the hollow support post 12 to the base body 11. The light emitter 31 can be, but not limited to, one of a fluorescent lamp, an incandescent lamp, a halogen lamp and an LED bulb. The wire 33 is used to electrically connect the light emitter 31 to an external power source connector, such as an electrical socket (not shown).

Figure 2:
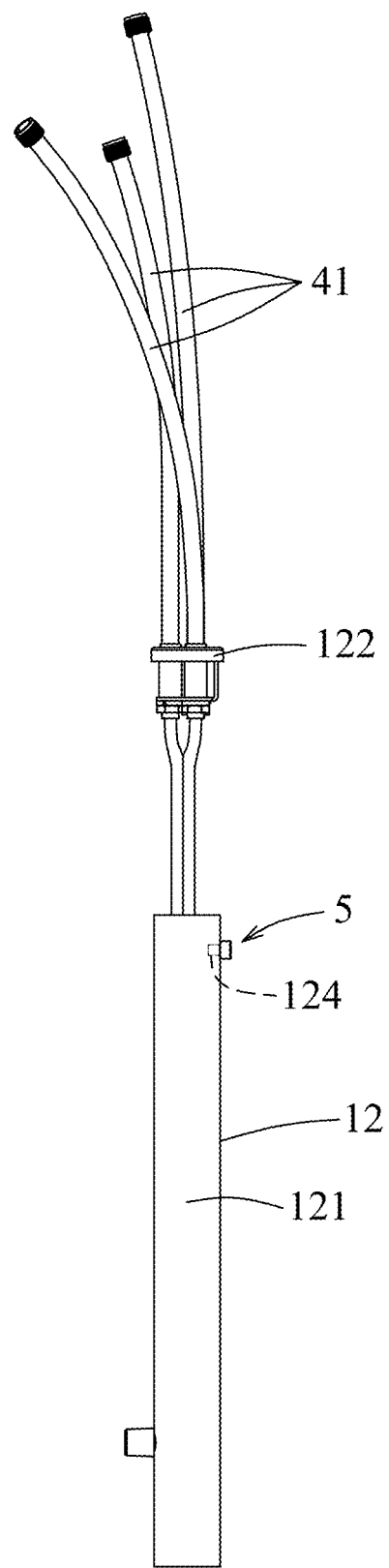
FIG. 2 illustrates connection rods inserted into a carrier, and a hollow support post of the first embodiment.
Figure 3:
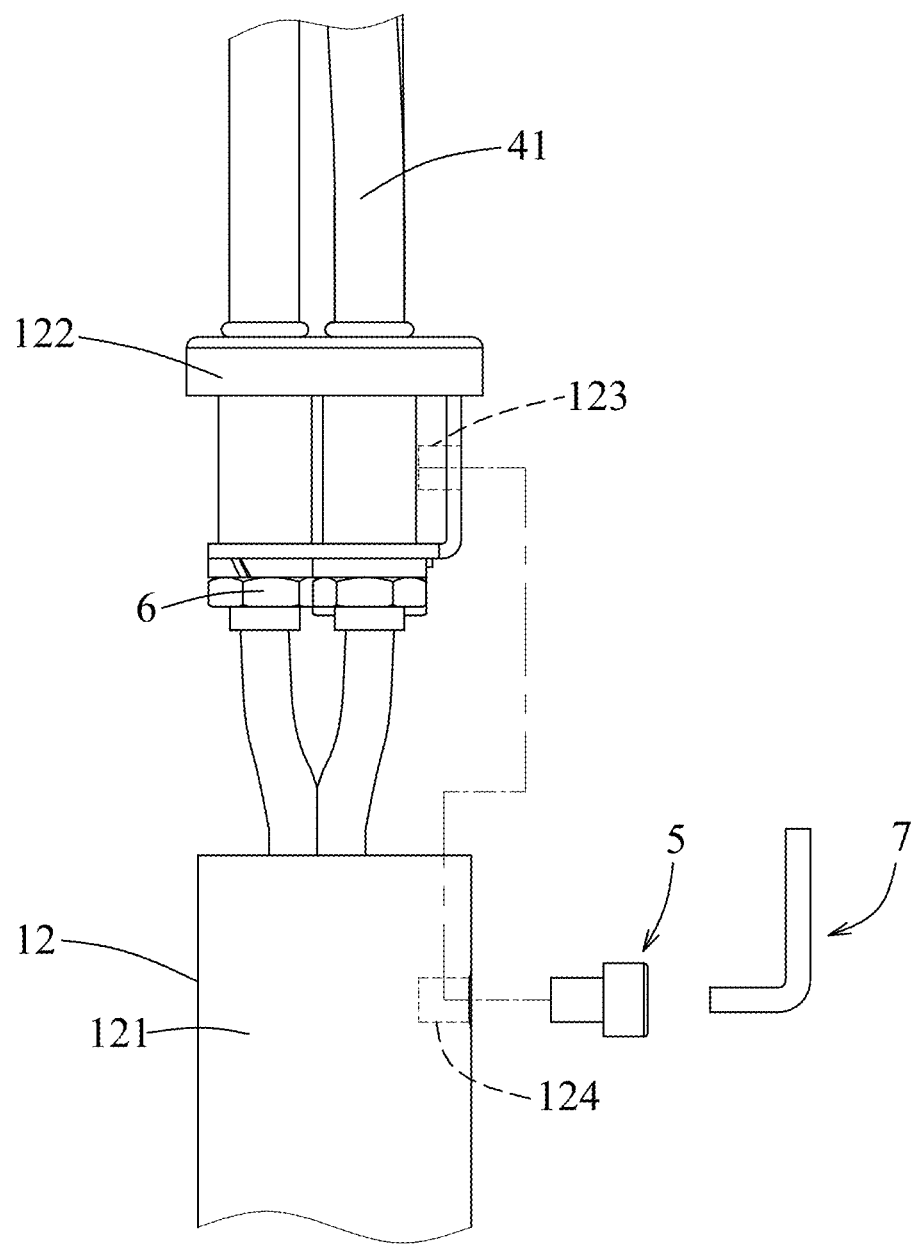
FIG. 3 is a fragmentary enlarged view of FIG. 2.

Referring to FIGS. 2 and 3, the hollow support post 12 has a post body 121 threadedly connected to the base body 11, and a fastening hole 124 formed on a top end of the post body 121. A carrier 122 is disposed on the top end of the post body 121 and has a threaded hole 123 being capable of communicating with and smaller in diameter than the fastening hole 124. The carrier 122 is partially inserted into and partially exposed from the top end of the post body 121. When the threaded hole 123 is aligned with the fastening hole 124, a screw 5 is rotated by a tool 7 into the fastening hole 124 and the threaded hole 123. Accordingly, the carrier 122 is fixedly assembled to the hollow support post 12 by the screw 5.

Figure 4:
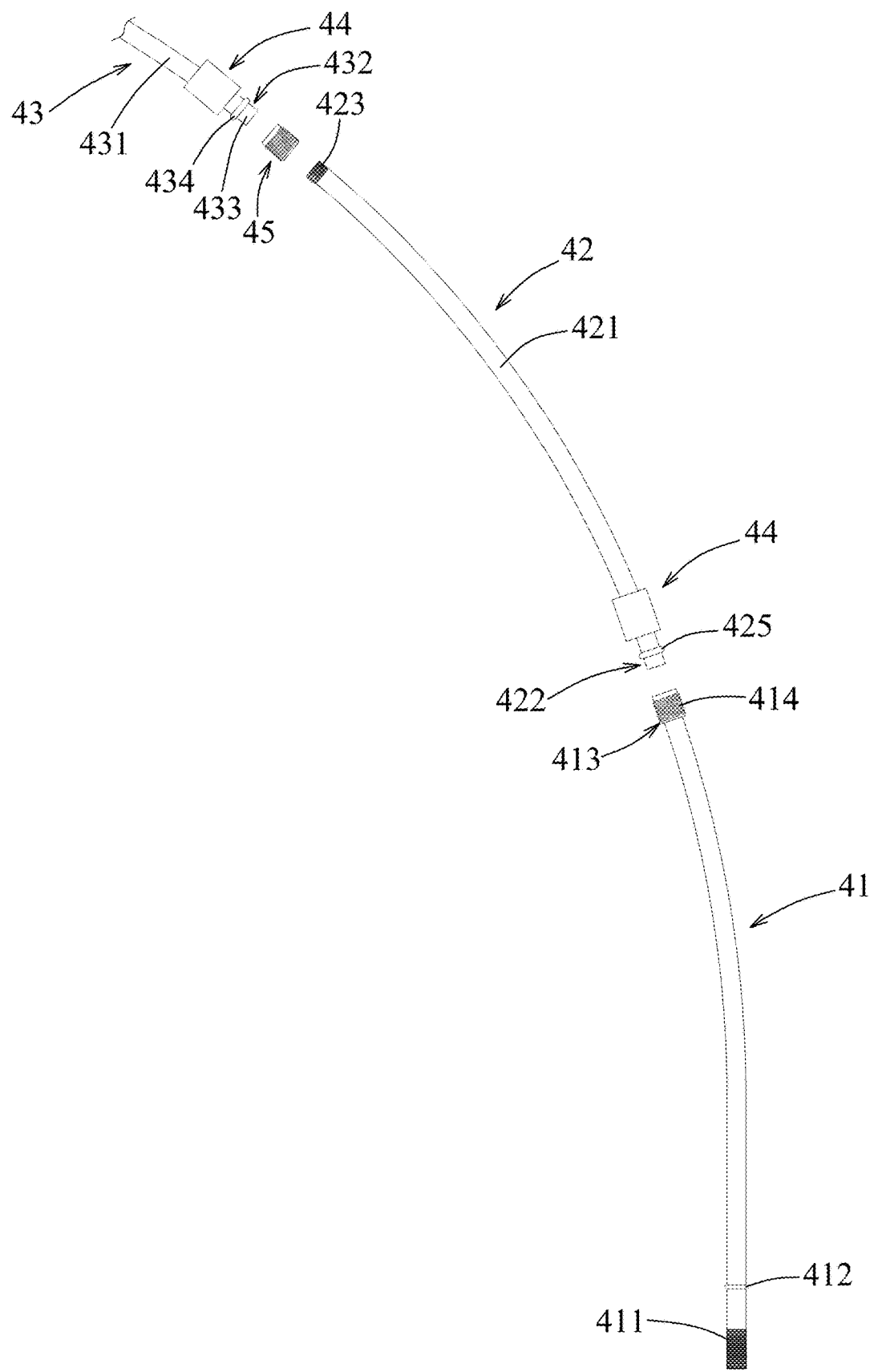
FIG. 4 illustrates a connection rod, a first extension rod, a second extension rod, tubular fasteners and a sleeve member of the first embodiment.

Referring to FIG. 4, in combination with FIGS. 1 and 2, the modular rod assemblies 4a, 4b, and 4c of the light modules 21 are assembled to and curvedly extend from the carrier 122 in a fishing pole style. The modular rod assembly 4a includes a connection rod 41 connected to the carrier 122, a first extension rod 42 removably connected to the connection rod 41, and a tubular fastener 44 movably disposed around the first extension rod 42. The modular rod assemblies 4b and 4c are different from the modular rod assembly 4a in that each of the modular rod assemblies 4b and 4c further includes a second extension rod 43 and a sleeve member 45. In addition, each of the modular rod assemblies 4b and 4c includes two tubular fasteners 44.

As shown in FIGS. 2 to 4, for each modular rod assembly 4a, 4b or 4c, the connection rod 41 that extends through the carrier 122 and has a connection thread 411 extending outward from a bottom end of the carrier 122, and a stop flange 412 disposed in abutment with a top end of the carrier 122 opposite to the connection thread 411. A nut 6 is threadedly sleeved around the connection thread 411. When the nut 6 is rotated relative to the connection thread 411 until it abuts the bottom end of the carrier 122, the stop flange 412 moves downward and tightly abuts the top end of the carrier 122 so that the connection rod 41 is secured to the carrier 122.

Figure 5:
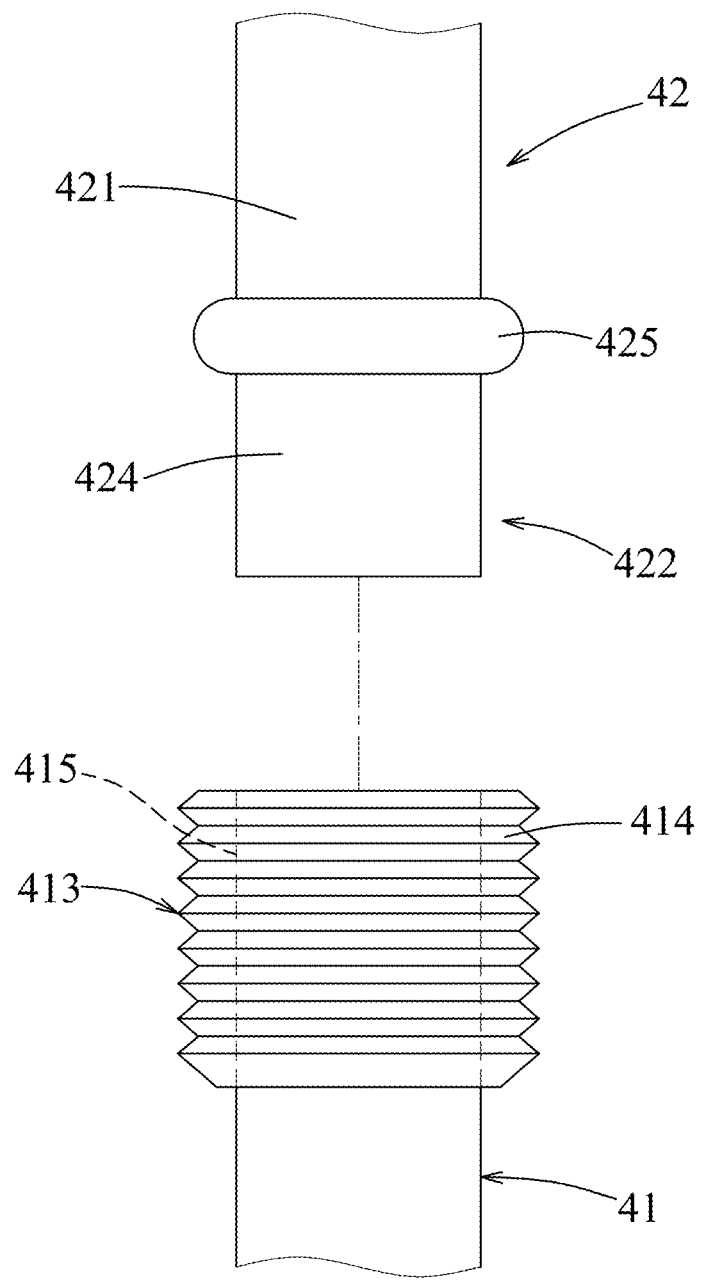
FIG. 5 is a fragmentary view, illustrating the connection rod and the first extension rod of the first embodiment.

Referring to FIG. 5, in combination with FIG. 4, the connection rod 41 further has a first coupling end 413 opposite to the stop flange 412 and the connection thread 411. The first coupling end 413 has a connection rod external thread 414 and a hole 415. The first extension rod 42 has a first rod body 421 and a second coupling end 422 connected to the first rod body 421. The first rod body 421 has a first extension rod external thread 423 opposite to the second coupling end 422. The second coupling end 422 has a first insertion portion 424 that extends downwardly from a bottom end of the first rod body 421, and a first annular flange 425 that extends radially and outwardly from the first insertion portion 424. The first annular flange 425 is spaced apart from a bottom end of the first insertion portion 424. The second extension rod 43 has a configuration generally similar to that of the first extension rod 42. The second extension rod 43 has a second rod body 431 and a third coupling end 432 connected to a bottom end of the second rod body 431. The third coupling end 432 has a second insertion portion 433 that extends downwardly from a bottom end of the second rod body 431, and a second annular flange 434 that extends radially and outwardly from the second insertion portion 433 and that is spaced apart from a bottom end of the second insertion portion 433.

While the first and second annular flanges 425, 434 are circular in this embodiment, they may be provided with a rectangular ring-shape or any other suitable ring-shape.

Figure 6:
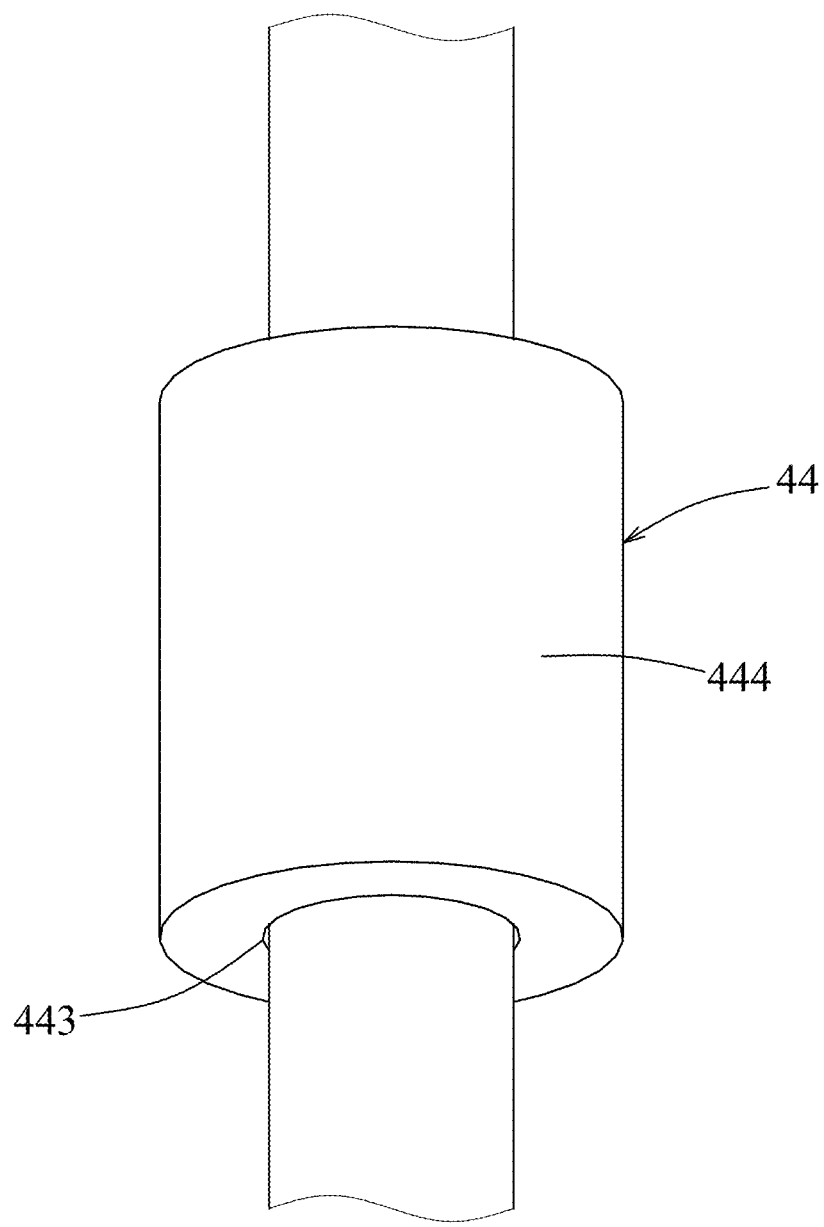
FIG. 6 is a fragmentary perspective view illustrating the tubular fastener of the first embodiment.
Figure 7:
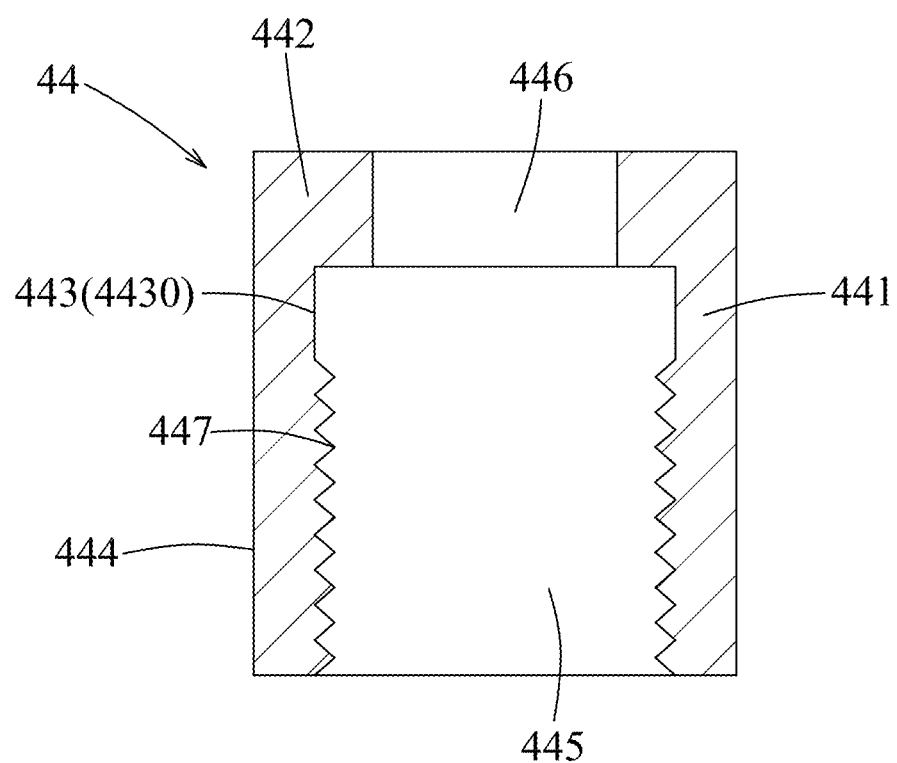
FIG. 7 is a sectional view illustrating the tubular fastener of the first embodiment.

Referring to FIGS. 6 and 7, each tubular fastener 44 has a tubular portion 441 and a loop-shaped endplate portion 442 transversely connected to the tubular portion 441. The tubular portion 441 has an inner surrounding surface 443 and an outer circumferential surface 444 opposite to the inner surrounding surface 443. The loop-shaped end plate portion 442 protrudes inwardly from a top end of the inner surrounding surface 443. The tubular portion 441 further has an enlarged hole 445 bounded by the inner surrounding surface 443. The loop-shaped endplate portion 442 bounds a narrowed hole 446. The narrowed hole 446 communicates with and is smaller in diameter than the enlarged hole 445. The inner surrounding surface 443 is formed with a fastener internal thread 447 and has a non-threaded region 4430 between the loop-shaped end plate portion 442 and the fastener internal thread 447. The fastener internal thread 447 is capable of engaging the connection rod external thread 414 of the connection rod 41.

Figure 9:
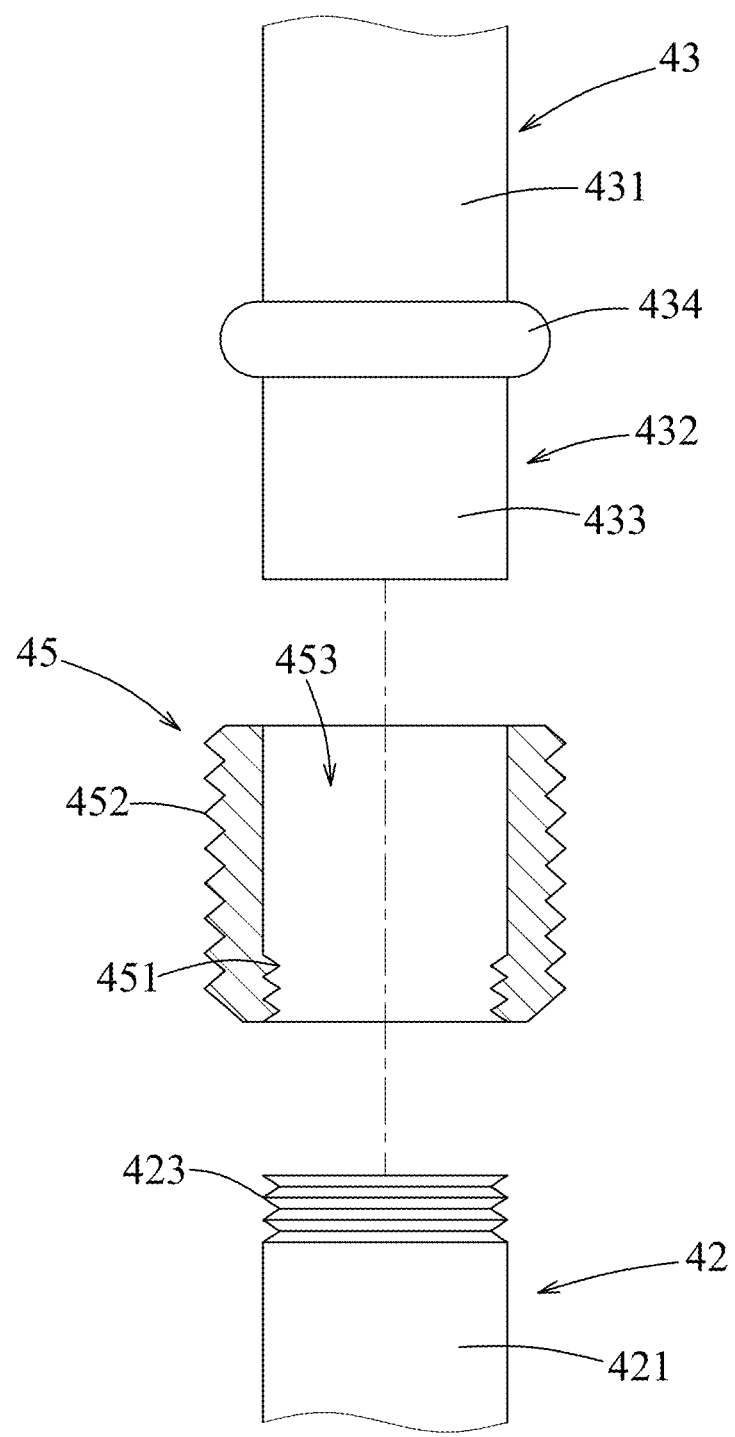
FIG. 9 is a partly sectional view, illustrating the first extension rod, the second extension rod and the sleeve member of the first embodiment.
Figure 10:
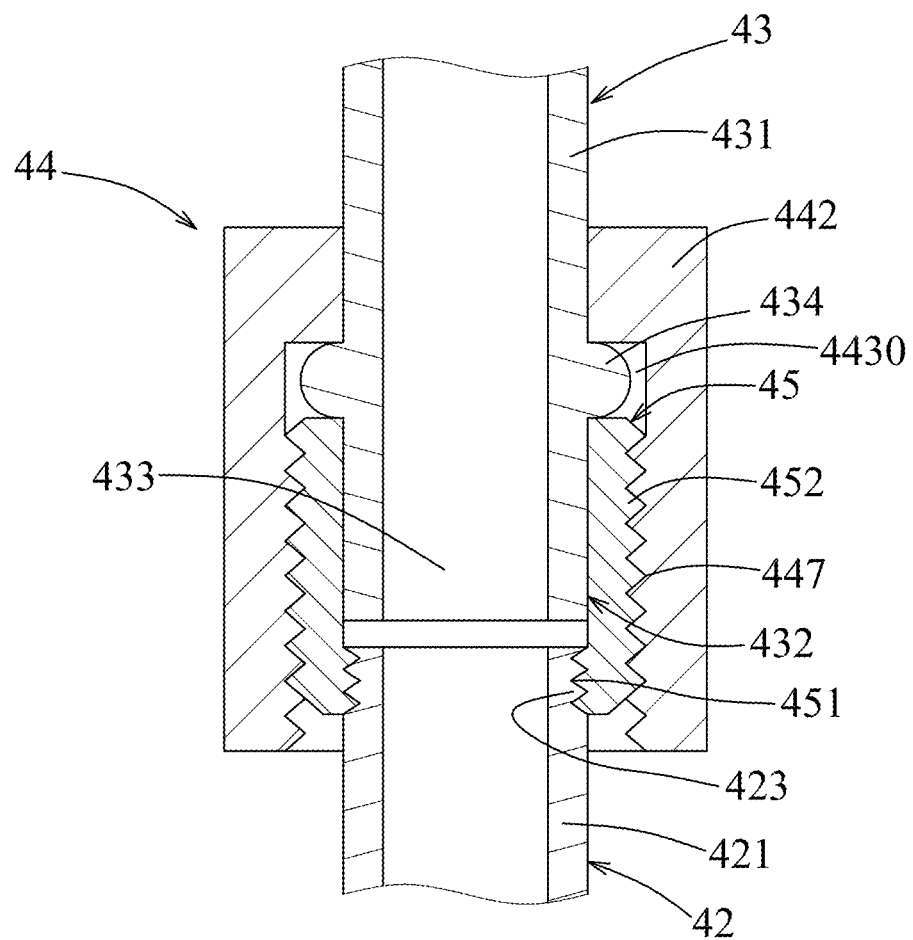
FIG. 10 is a fragmentary sectional view, illustrating the connection of the first extension rod to the second extension rod by the sleeve member.

Referring to FIGS. 9 and 10, in combination with FIG. 4, the sleeve member 45 has a sleeve member internal thread 451 threadedly connected to the extension rod external thread 423 of the first extension rod 42, and a sleeve member external thread 452 engageable with the fastener internal thread 447 of the tubular fastener 44. The sleeve member 45 further has a reception hole 453 allowing insertion of the second insertion portion 433 of the second extension rod 43.

Figure 8:
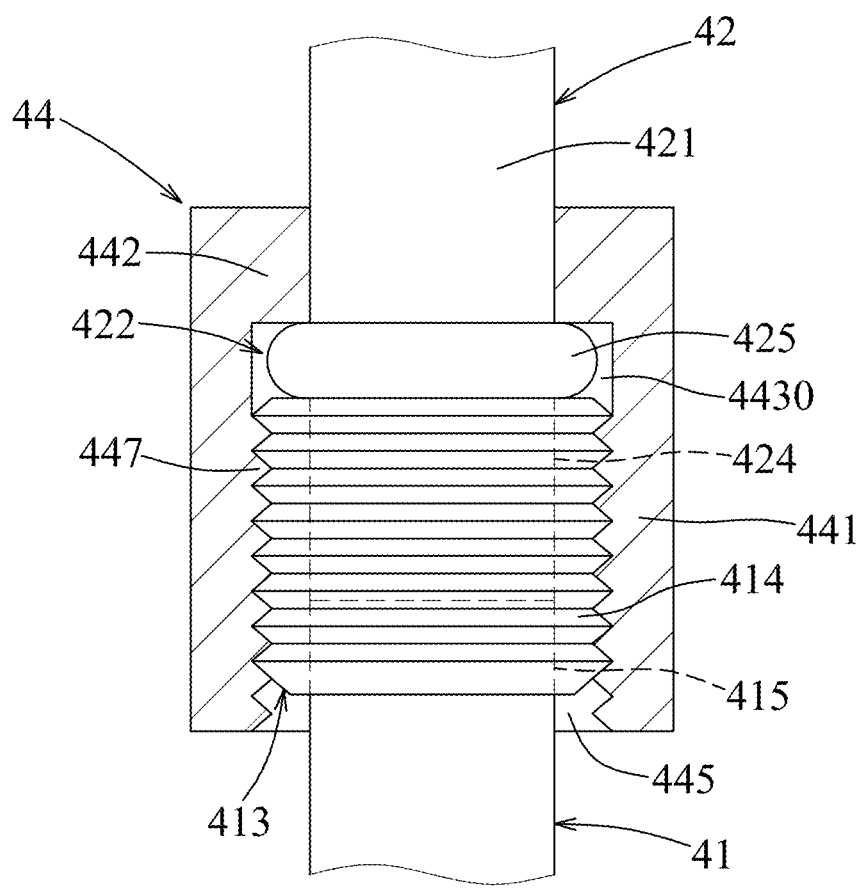
FIG. 8 is a partly sectional view illustrating the connection of the connection rod to the first extension rod by the tubular fastener.

Referring to FIG. 8, in combination with FIGS. 5 to 7, to assemble the connection rod 41 and the first extension rod 42 of the modular rod assembly 4a, 4b or 4c, the second coupling end 422 of the first extension rod 42 is removably inserted into the first coupling end 413 of the connection rod 41 in a manner that the first insertion portion 424 of the second coupling end 422 is fittingly or engagingly inserted into the hole 415 of the first coupling end 413 and that the first annular flange 425 of the second coupling end 422 abuts the top end of the first coupling end 413. By interengagement of the inserted first insertion portion 424 with the hole 415, the first extension rod 42 can be prevented from swaying with respect to the connection rod 41. Subsequently, the tubular fastener 44 is put around the first extension rod 42 from the top end thereof such that the first rod body 421 of the first extension rod 42 extends through the narrowed hole 446 from the enlarged hole the 445. After the tubular fastener 44 is moved downward to the second coupling end 422, the operator may grip the outer circumferential surface 444 of the tubular fastener 44 and rotate the same until the fastener internal thread 447 of the tubular fastener 44 is tightened to the connection rod external thread 414 of the first coupling end 413. During rotation of the tubular fastener 44, the tubular fastener 44 moves downward relative to the first coupling end 413, and the first coupling end 413 is gradually moved into the enlarged hole 445 until it is entirely sleeved by the tubular fastener 44.

When the non-threaded region 4430 of the tubular fastener 44 receives the first annular flange 425 and the first annular flange 425 abuts the loop-shaped end plate portion 442, the first annular flange 425 is clamped by the first coupling end 413 of the connection rod 41 and the loop-shaped end plate portion 442. By virtue of the tubular fastener 44 that is operable to sleeve around the first extension rod 42 and the connection rod 41 and rotatable to threadedly connect the first coupling end 413 to clamp the first annular flange 425 in the non-threaded region 4430, the first extension rod 42 and the connection rod 41 are fixedly connected to each other.

Referring back to FIGS. 9 and 10, to assemble the first extension rod 42 to the second extension rod 43 of the modular rod assembly 4b or 4c, the sleeve member internal thread 451 of the sleeve member 45 is threadedly connected to the extension rod external thread 423 of the first extension rod 42. The second insertion portion 433 of the second extension rod 43 is engagingly inserted into the reception hole 453 of the sleeve member 45. The second annular flange 434 of the second extension rod 43 abuts the top end of the sleeve member 45. By disposing the inserted second insertion portion 433 in engagement with the reception hole 453, the second extension rod 43 is prevented from swaying with respect to the first extension rod 42. Subsequently, the tubular fasteners 44 is sleeved around the third coupling end 432 and the sleeve member 45, and the tubular fastener 44 is rotated to engage the fastener internal thread 447 of the tubular fastener 44 with the sleeve member external thread 452 of the sleeve member 45. During rotation of the tubular fastener 44, the sleeve member 45 gradually extends into the enlarged hole 445 of the tubular fastener 44.

When the loop-shaped end plate portion 442 of the tubular fastener 44 abuts the second annular flange 434, the tubular fastener 44 is unable to move relative to the sleeve member 45, and the loop-shaped end plate portion 442 and the sleeve member 45 cooperatively clamp the second annular flange 434.

Figure 11:
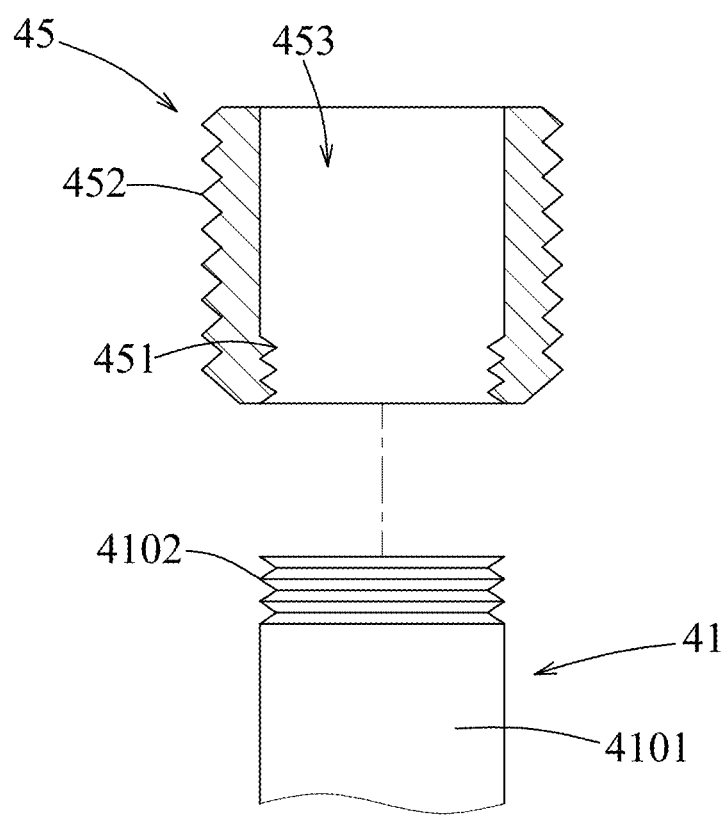
FIG. 11 is a fragmentary exploded view illustrating an alternative connection rod of the first embodiment.
Figure 12:
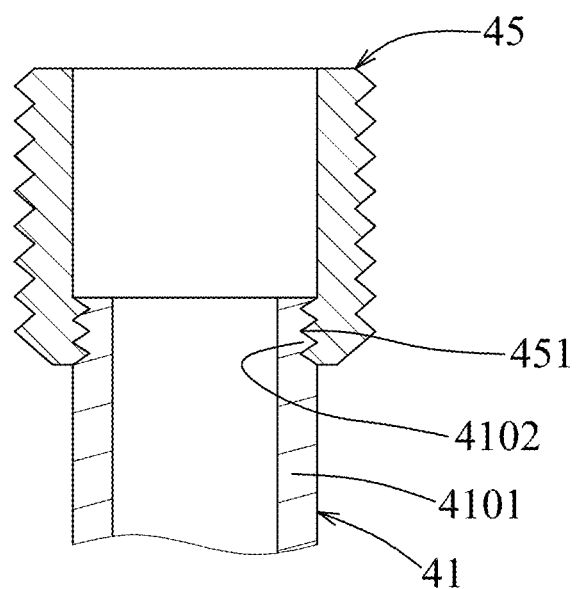
FIG. 12 is a fragmentary sectional view illustrating the alternative connection rod of FIG. 11.

It is worth mentioning that the connection rod 41 in this embodiment is a one-component structure. However, according to other embodiments, the connection rod 41 may have a two-component structure. As shown in FIGS. 11 and 12, the connection rod 41 has a connection rod main body 4101 formed with a main body external thread 4102, and a sleeve member 45, which is similar in structure to the sleeve member 45 connected to the first extension rod external thread 423 of the first extension rod 42 (see FIG. 9). The sleeve member 45 of the connection rod 41 has a sleeve member internal thread 451 connectable to the main body external thread 4102, and a sleeve member external thread 452. When the sleeve member internal thread 451 is threadedly connected to the main body external thread 4102, the sleeve member 45 serves to form the first coupling end 413 of the connection rod 41, and the sleeve member external thread 452 serves to form the connection rod external thread 414.

Figure 13:
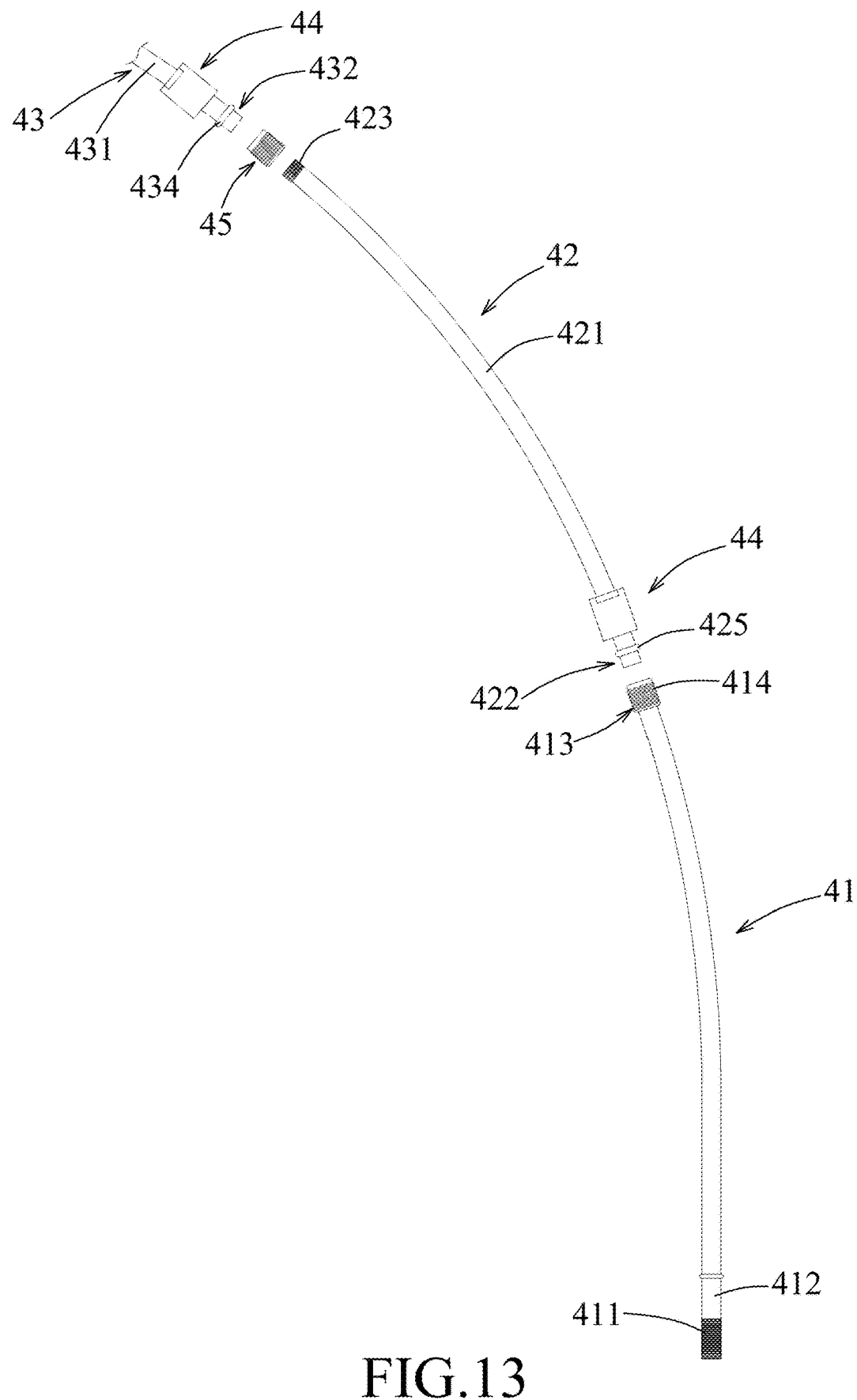
FIG. 13 illustrates a modular rod assembly according to a second embodiment of the disclosure.
Figure 14:
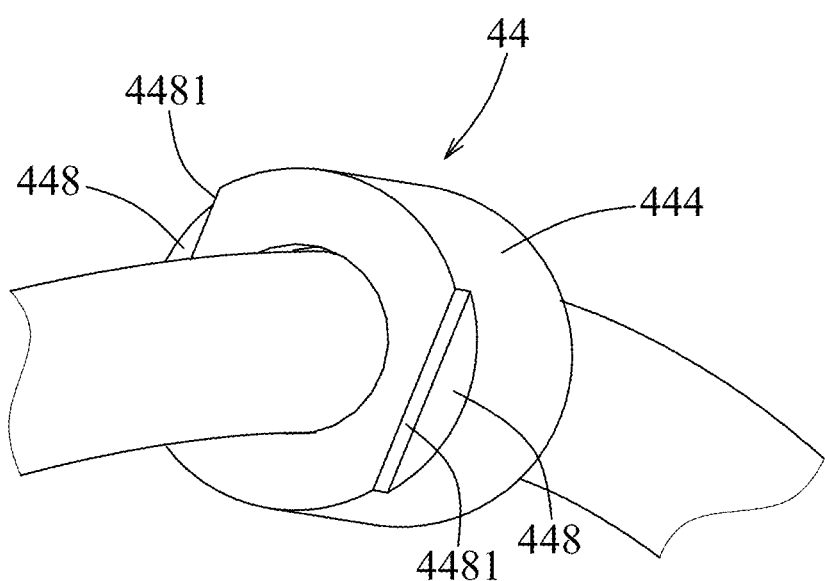
FIG. 14 illustrates a tubular fastener of the second embodiment.

FIGS. 13 and 14 illustrate a lighting assembly according to a second embodiment of the disclosure, which has a structure generally similar to that of the first embodiment. However, in the second embodiment, each tubular fastener 44 has a structure different from that of the first embodiment. The outer circumferential surface 444 of each tubular fastener 44 is formed with two diametrically opposite notches 448. Each tubular fastener 44 further has two flat facets 4481 that are respectively formed in the notches 448 and that are parallel with each other (see FIG. 12). The flat facets 4481 allows a user to use a tool for gripping and rotating the tubular fastener 44 by placing the tool in abutment with the flat facets 4481. The tubular fastener 44 of this embodiment can facilitate the operation of assembling the modular rod assembly of the disclosure.

Figure 15:
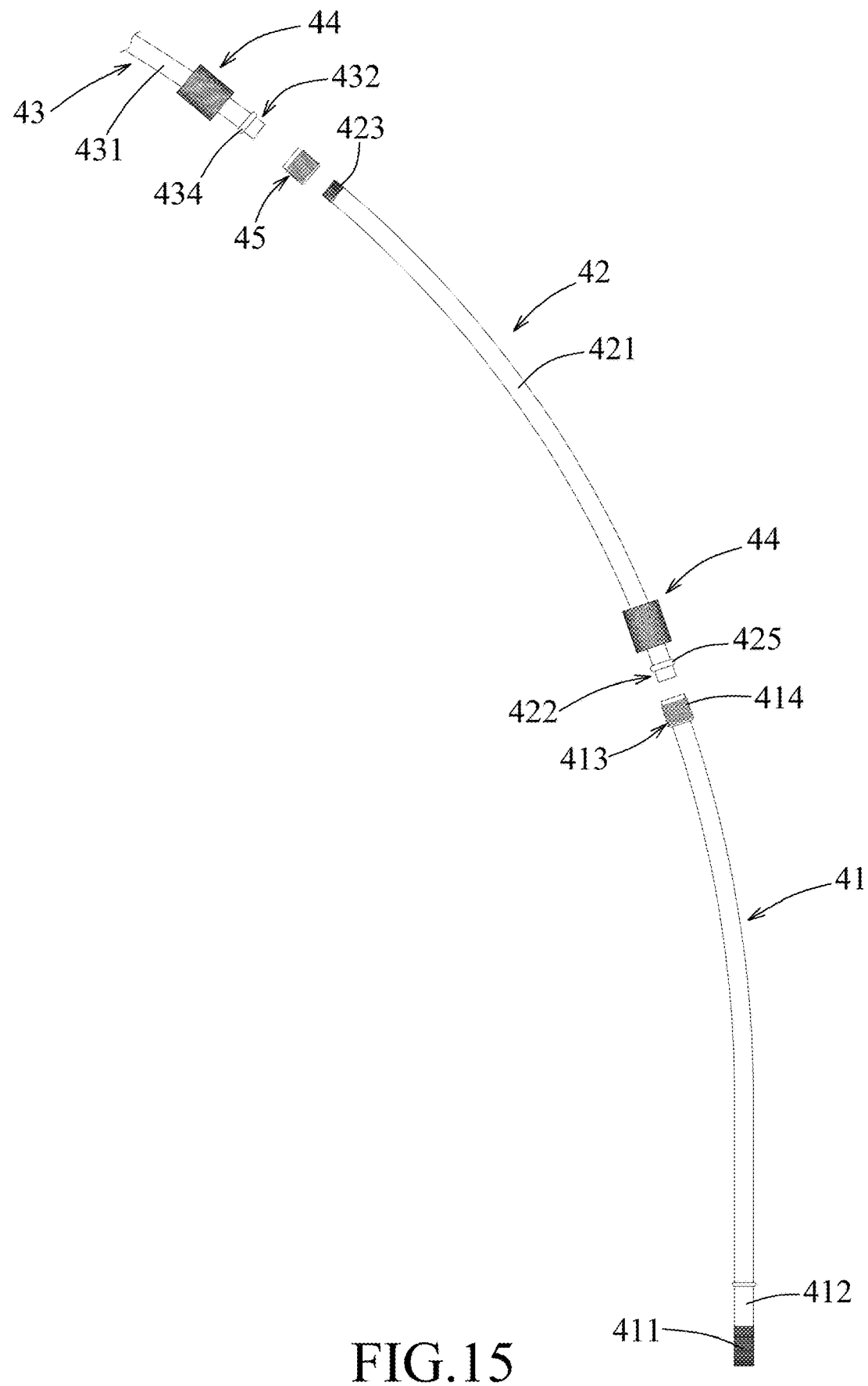
FIG. 15 illustrates a modular rod assembly according to a third embodiment of the disclosure.
Figure 16:
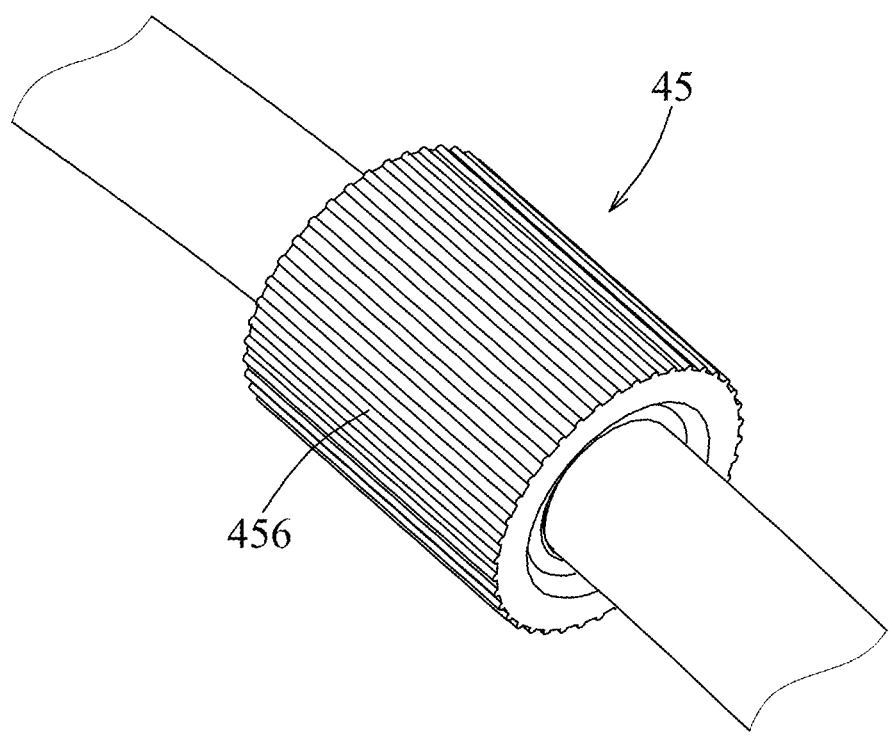
FIG. 16 illustrates a tubular fastener of the third embodiment.

FIGS. 15 and 16 illustrate a lighting assembly according to a third embodiment of the disclosure, which has a structure generally similar to that of the first embodiment. However, in the third embodiment, the outer circumferential surface 444 of each tubular fastener 44 is formed with a knurled texture, which facilitates gripping and rotating the tubular fastener 44 by the user's hand.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A lighting assembly comprising:
   a light stand;
   a plurality of light modules each including a lighting unit and a modular rod assembly connecting between said lighting unit and said light stand, said lighting unit having a light emitter, and a wire connecting said light emitter, said modular rod assembly including
   a connection rod and a first coupling end connected to said connection rod, said first coupling end having an inner surface defining a hole, and an outer surface formed with a connection rod external thread,
   a first extension rod having a first rod body, and a second coupling end connected to said first rod body, said second coupling end having a first insertion portion distal from said first rod body, and a first annular flange extending radially and outwardly between said first insertion portion and said first rod body, said first insertion portion being unthreaded and inserted into said hole of said first coupling end, said first annular flange abutting an end face of said first coupling end, and
   at least one tubular fastener disposed around said first extension rod, said at least one tubular fastener having a tubular portion and a loop-shaped end plate portion, said tubular portion having an inner surrounding surface extending around said first annular flange and said connection rod external thread and formed with a fastener internal thread, said loop-shaped end plate portion being transverse to said inner surrounding surface, said fastener internal thread engaging said connection rod external thread, said first annular flange being clamped between said end face of said first coupling end and said loop-shaped end plate portion;

wherein each of said connection rod and said first extension rod is hollow and arcuated, said first coupling end having an inner surface defining said hole and an outer surface formed with said connection rod external thread, an outer diameter of said connection rod external thread being larger than an outer cross section of said connection rod, a cross section of said hole corresponding to an outer cross section of said first insertion portion and an outer cross section of said connection rod, an inner cross section of said first insertion portion corresponding to an inner cross section of said connection rod, said wire extending from said light emitter to said light stand through an interior hollow space of each of said first rod body, said first insertion portion, and said connection rod; and wherein said connection rods and said first extension rods of said modular rod assemblies of said light modules extend upwardly and branch out from said light stand.

2. The lighting assembly as claimed in claim 1, wherein said first annular flange has two opposite surfaces respectively abutting said loop-shaped end plate portion and said end face of said first coupling end, and a convexed outer peripheral surface that connects between said opposite surfaces and that slopes from both of said opposite surfaces to extend gradually away from both of said loop-shaped end plate portion and said end face and to convex towards said inner surrounding surface of said tubular portion.

* * * * *